US011392764B2

(12) United States Patent
Ezen Can et al.

(10) Patent No.: US 11,392,764 B2
(45) Date of Patent: *Jul. 19, 2022

(54) CLASSIFYING TEXT TO DETERMINE A GOAL TYPE USED TO SELECT MACHINE LEARNING ALGORITHM OUTCOMES

(71) Applicant: International Business Machines Corporation, Armonk, NY (US)

(72) Inventors: Aysu Ezen Can, Wake, NC (US); David Contreras, Willow Spring, NC (US); Bob Delima, Apex, NC (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 394 days.

This patent is subject to a terminal disclaimer.

(21) Appl. No.: 16/453,221

(22) Filed: Jun. 26, 2019

(65) Prior Publication Data
US 2019/0318263 A1 Oct. 17, 2019

Related U.S. Application Data

(63) Continuation of application No. 15/953,349, filed on Apr. 13, 2018.

(51) Int. Cl.
*G06F 16/33* (2019.01)
*G06F 40/205* (2020.01)
(Continued)

(52) U.S. Cl.
CPC .......... *G06F 40/20* (2020.01); *G06F 16/3344* (2019.01); *G06F 40/205* (2020.01); *G06N 20/00* (2019.01)

(58) Field of Classification Search
CPC ............. G06F 19/3431; G06F 16/3344; G06F 40/205; G06K 9/6256; G06N 7/005; G06N 20/00
See application file for complete search history.

(56) References Cited

U.S. PATENT DOCUMENTS 6,092,059 A 7/2000 Straforini et al.
8,880,388 B2 * 11/2014 Ferrucci .................. G06F 40/30
704/7

(Continued)

FOREIGN PATENT DOCUMENTS

CN 101782976 * 4/2013
CN 101782976 A 4/2013

OTHER PUBLICATIONS

Wikipedia, "Ensemble Learning", (online) retrieved from the Internet on Oct. 5, 2017, at URL>https://en.wikipedia.org/wiki/Ensemble_learning, Total 4 pages.

(Continued)

*Primary Examiner* — Scott T Baderman
*Assistant Examiner* — Mario M Velez-Lopez
(74) *Attorney, Agent, or Firm* — Konrad Raynes Davda & Victor LLP; David W. Victor

(57) ABSTRACT

Provided are a computer program product, system, and method for classifying text to determine a goal type used to select machine learning algorithm outcomes. Natural language processing of text is performed to determine features in the text and their relationships. A classifier classifies the text based on the relationships and features to determine a goal type. The determined features and relationships from the text are inputted into a plurality of different machine learning algorithms to generate outcomes. For each of the machine learning algorithms, a determination is made of performance measurements resulting from the machine learning algorithms generating the outcomes. A determina- (Continued)

| Machine Learning Algorithm ID (302) | Outcome (304) | Accuracy Score (306) | Precision Score (308) | Recall Score (310) | Execution Time (312) |
|---|---|---|---|---|---|

Machine Learning Output ($300_i$)

tion is made of at least one machine learning algorithm having performance measurements that are highly correlated to the determined goal type. An outcome is determined from at least one of the outcomes.

12 Claims, 6 Drawing Sheets

(51) Int. Cl.
    *G06N 20/00*     (2019.01)
    *G06F 40/20*     (2020.01)

(56) References Cited

U.S. PATENT DOCUMENTS

| | | | |
|---|---|---|---|
| 9,002,867 B1 * | 4/2015 | Adams | G06F 16/23 707/723 |
| 9,679,261 B1 | 6/2017 | Hoover et al. | |
| 10,121,386 B2 * | 11/2018 | Allen | G09B 7/00 |
| 10,990,645 B1 * | 4/2021 | Shi | G06N 3/08 |
| 2007/0203863 A1 * | 8/2007 | Gupta | G06N 3/0454 706/20 |
| 2012/0179633 A1 * | 7/2012 | Ghani | G06F 16/35 706/12 |
| 2013/0017524 A1 * | 1/2013 | Barborak | G06N 5/041 434/322 |
| 2015/0193583 A1 * | 7/2015 | McNair | G16H 50/20 705/2 |
| 2015/0235131 A1 * | 8/2015 | Allen | G06F 16/3329 706/48 |
| 2015/0294216 A1 * | 10/2015 | Baughman | G06N 20/00 706/11 |
| 2015/0379428 A1 * | 12/2015 | Dirac | G06N 20/00 706/12 |
| 2015/0379429 A1 * | 12/2015 | Lee | G09B 5/00 706/11 |
| 2016/0055426 A1 | 2/2016 | Aminzadeh et al. | |
| 2016/0104075 A1 * | 4/2016 | Chowdhury | G06F 40/211 706/12 |
| 2016/0379139 A1 * | 12/2016 | Eldar | G06F 16/35 706/12 |
| 2018/0075368 A1 * | 3/2018 | Brennan | G06N 20/00 |
| 2019/0163875 A1 | 5/2019 | Allen et al. | |
| 2019/0318269 A1 * | 10/2019 | Ezen Can | G06F 40/205 |
| 2020/0264876 A1 * | 8/2020 | Lo | G06F 9/30025 |
| 2021/0255745 A1 * | 8/2021 | Maclean | G06N 20/00 |

OTHER PUBLICATIONS

M.Song et al., "A Multi-Classifier Based Guideline Sentence Classification System", dated Dec. 17, 2011, Healthcare Informatics Research (HIR), Total 8 pages.
Exsilo Solutions "Accuracy, Precision, Recall & F1 Score: Interpretation of Performance Measures", dated Sep. 9, 2016, (online), retrieved from the Internet at URL>http://blog.exsilio.com/all/accuracy-precision-recall-f1-score-interpretation-of-performance-measures/, Total 6 pages.
F. Parisi et al., "Ranking and Combining Multiple Predictors Without Labeled Data", dated Nov. 24, 2013, Yale University School of Medicine, Department of Pathology, Total 26 pages.
Polikar, "Ensemble Learning" dated 2009, (online) retrieved from the Internet at URL>http://www.scholarpedia.org/article/Ensemble_learning, Total 10 pages.
Machine Translation of CN101782976A, published Apr. 10, 2013, Total 7 pages.
US Patent Application , dated Apr. 13, 2018, for U.S. Appl. No. 15/953,349, filed Apr. 13, 2019, Total 31 pages.
Preliminary Amendment, dated Jun. 26, 2019, for U.S. Appl. No. 15/953,349, filed Apr. 13, 2019, Total 7 pages.
List of Patents and Applications Treated as Related, dated Jun. 26, 2019, Total 2 pages.
Rief et al., "Auto Classifier Selection for Non-Experts" dated Feb. 2012, Article in Pattern Analysis and Applications, Total 21 pages.
C. Brodley , "Recursive Automatic Bias Selection for Classifier Construction", dated 1995, School of Electrical and Computer Engineering, Purdue University, Total 32 pages.
Ko et al., "From Dynamic Classifier Selection to Dynamic Ensemble Selection", dated 2008, Science Direct Pattern Recognition, Total 14 pages.
Spiliopoulou et al, "NOEMON: An Intelligent Assistant for Classifier Selection", dated Aug. 1999, Research Gate, Total 9 pages.
Cacoveanu et al., "Evolutional Meta-Learning Framework for Automatic Classifier Selection" dated 2009, Total 4 pages.
Office Action1 , dated Aug. 31, 2021, for U.S. Appl. No. 15/953,349, filed Apr. 13, 2019, Total 20 pages.
Notice of Allowance dated Apr. 1, 2022, pp. 13, for U.S. Appl. No. 15/953,349.

* cited by examiner

CLASSIFYING TEXT TO DETERMINE A GOAL TYPE USED TO SELECT MACHINE LEARNING ALGORITHM OUTCOMES

BACKGROUND OF THE INVENTION

1. Field of the Invention

The present invention relates to a computer program product, system, and method for classifying text to determine a goal type used to select machine learning algorithm outcomes.

2. Description of the Related Art

A machine learning program may be trained to produce outcomes based on input text. For instance, text in a medical record may be processed using natural language processing to detect words related to medical conditions which are then inputted into a machine learning algorithm to classify a medical diagnosis based on the detected medical conditions in the text, such as in an electronic patient record. In ensemble learning, multiple machine learning models may be used to classify outcomes from input text to improve the predictive outcome to decrease variance, bias and improve predictions There is a need in the art for improved techniques to use an ensemble of machine learning algorithms to determine predictive outcomes from input.

SUMMARY

Provided are a computer program product, system, and method for classifying text to determine a goal type used to select machine learning algorithm outcomes. Natural language processing of text is performed to determine features in the text and their relationships. A classifier classifies the text based on the relationships and features of the text to determine a goal type of a plurality of goal types. The determined features and relationships from the text are inputted into a plurality of different machine learning algorithms to generate outcomes for the text. For each of the machine learning algorithms, a determination is made of performance measurements resulting from the machine learning algorithms generating the outcomes. A determination is made of at least one machine learning algorithm of the machine learning algorithms having performance measurements that are highly correlated to the determined goal type. An outcome is determined from at least one of the outcomes of the determined at least one machine learning algorithm.

DETAILED DESCRIPTION

In an ensemble of machine learning algorithms, multiple models are used to generate outcomes from the input text or other input data. However, understanding whether different of the classifiers, or machine learning algorithms, are most suitable for the type of input text being processed requires deep knowledge of how each machine learning algorithm works, and such expertise for a specific domain may not be available. In order to select among different machine learning algorithms to use in a particular context, an understanding of the machine learning algorithms used to generate the outcome and the underlying data is required.

Described embodiments provide improvements to the computer technology for machine learning processing by providing computer technology to improve selection of machine learning algorithms from an ensemble of algorithms to use to provide the outcomes for input text. Described embodiments use a classifier to classify text to classify based on relationships and features determined in the text to determine a goal type of the text. Features and relationships of the input text are inputted to machine learning algorithms that produce outcomes along with performance measurements. A determination is made of at least one machine learning algorithm having performance measurements most highly correlated with the determined goal type so that outcomes may be selected from the determined at least one machine learning algorithm most correlated to the goal type of the input text.

With the described embodiments, machine learning algorithms from an ensemble of learning algorithms are automatically selected to provide the outcome based on a goal type or criteria of the input text and the performance measurements of the machine learning algorithms. In this way, more optimal selection of the machine learning algorithm is made because outcomes are selected from those machine learning algorithms having performance measurements most correlated to the determined goal types of the input text as determined by a classifier algorithm that classifies a goal or criteria of the text, such as a scope of a question, whether the question requires accuracy, precision or recall, i.e., a large field of answers.

Figure 1:
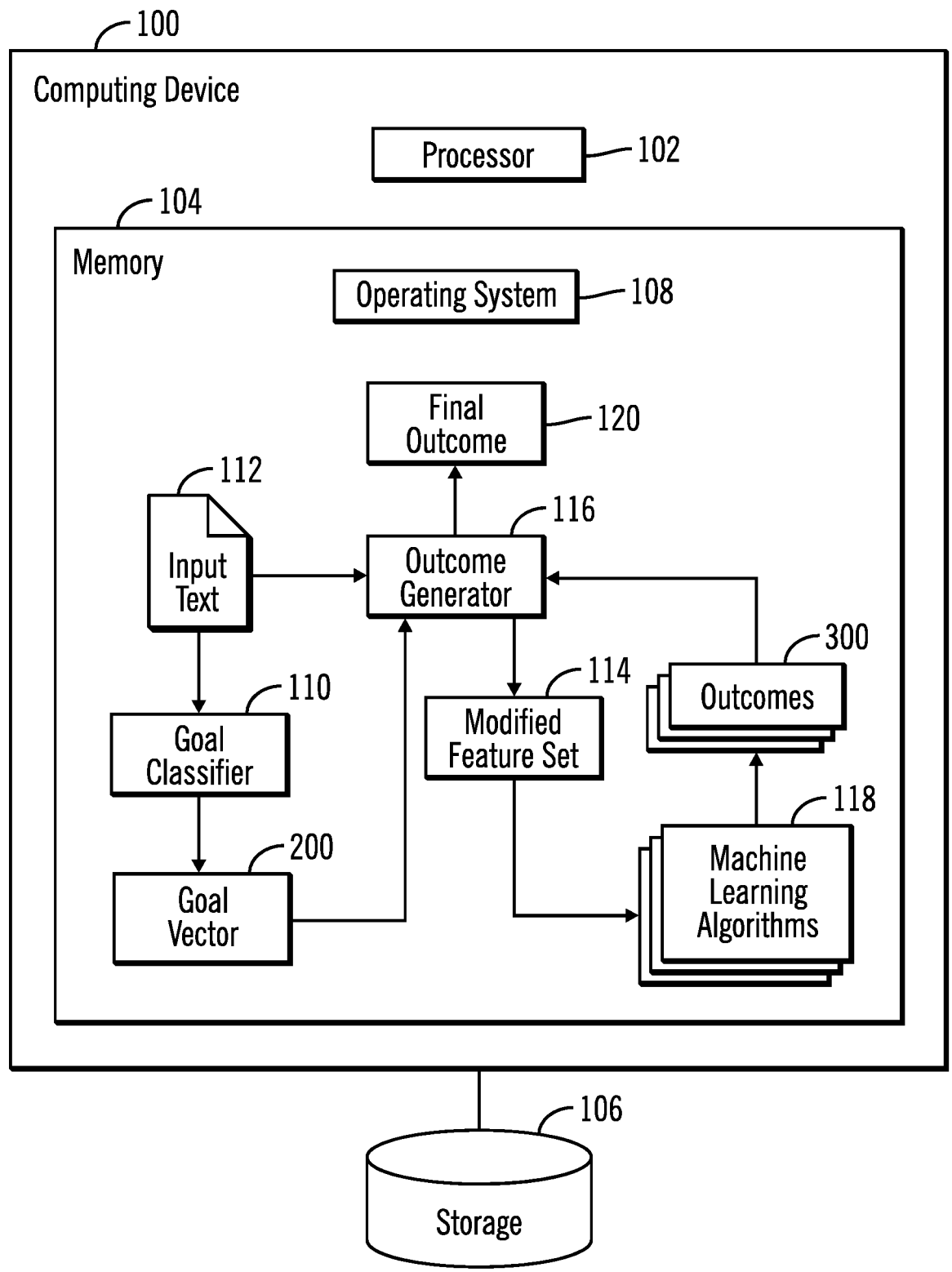
FIG. 1 illustrates an embodiment of a computing device.

FIG. 1 illustrates an embodiment of a computing device 100 in which embodiments are implemented. The computing device 100 includes a processor 102, a main memory 104, and a storage 106. The main memory 104 includes various program components including an operating system 108, a goal classifier 110 to process input text 112, such as sentences, questions, etc., to determine a goal vector 200 from the text, such as an accuracy score, recall score, precision score, execution time score, etc., where the goal of the text would be the highest score in the vector; an outcome generator 116 to supply the input text 112 and/or a modified feature set 114 to machine learning algorithms 118, such as an ensemble of machine learning algorithms implementing different algorithms, to process input text 112 or features from the input text 112 to generate outcomes 300 for which the machine learning algorithms 118 are trained. The modified feature set 114 may exclude features determined from the input text 112 having features unrelated to the determined goal type from the goal vector 200. The outcome generator 116 receives the outcomes 300 and uses the goal type, determined from the goal vector 200, to select outcomes 300 having performance measurements most highly correlated with the determined goal type and then produces a final outcome 120 based on the outcomes 300 most highly correlated to the goal type in the goal vector 200. FIG. 1 shows arrows to illustrate the program flow of processing and data among the program components 110, 116, and 118 executing in the memory 104.

The goal classifier 110 may implement a machine learning technique such as decision tree learning, association rule learning, neural network, inductive programming logic, support vector machines, Bayesian network, etc., to determine a goal type based on the input text 112. In certain embodiments the goal types may include accuracy—a ratio of correctly predicted observation to the total observations; precision—a ratio of correctly predicted positive observations to the total predicted positive observations; recall—a ratio of correctly predicted positive observations to all observations in an actual class; an F1 score—the weighted average of precision and recall; and execution time, indicating a permissible time to complete execution to produce the outcome. An outcome may be determined to be most highly correlated to the goal type, if the outcome has a highest performance score for the goal type or a performance score satisfying a high threshold for the goal type. For instance, if the goal type is precision for a question in the input text having a high degree of specificity, then the outcome having a highest precision score or precision score satisfying a threshold among performance measurements would be determined to be most highly correlated.

The machine learning algorithms 118 may comprise an ensemble of different machine learning models that are capable of processing input text 112 to determine outcomes 300 based on training of the machine learning algorithms 118 to produce specific results. The machine learning algorithms 118 may determine outcomes for input text 112 using different techniques such as decision tree learning, association rule learning, neural network, inductive programming logic, support vector machines, Bayesian network, etc.

The computing device 100 may store program components, such as 108, 110, 116, and 118, input text 112, and the output, such as the outcomes 300 and final outcome 120 in a non-volatile storage 106, which may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 104 may comprise a suitable volatile or non-volatile memory devices, including those described above.

Generally, program modules, such as the program components 108, 110, 116, and 118 may comprise routines, programs, objects, components, logic, data structures, and so on that perform particular tasks or implement particular abstract data types. The program components and hardware devices of the computing device 100 of FIG. 1 may be implemented in one or more computer systems, where if they are implemented in multiple computer systems, then the computer systems may communicate over a network.

The program components 108, 110, 116, and 118 may be accessed by the processor 102 from the memory 104 to execute. Alternatively, some or all of the program components 108, 110, 116, and 118 may be implemented in separate hardware devices, such as Application Specific Integrated Circuit (ASIC) hardware devices.

The functions described as performed by the program 108, 110, 116, and 118 may be implemented as program code in fewer program modules than shown or implemented as program code throughout a greater number of program modules than shown.

Although embodiments are described as classifying input text, in alternative embodiments may provide input in other media formats, such as audio, video, graphics, etc.

Figure 2:
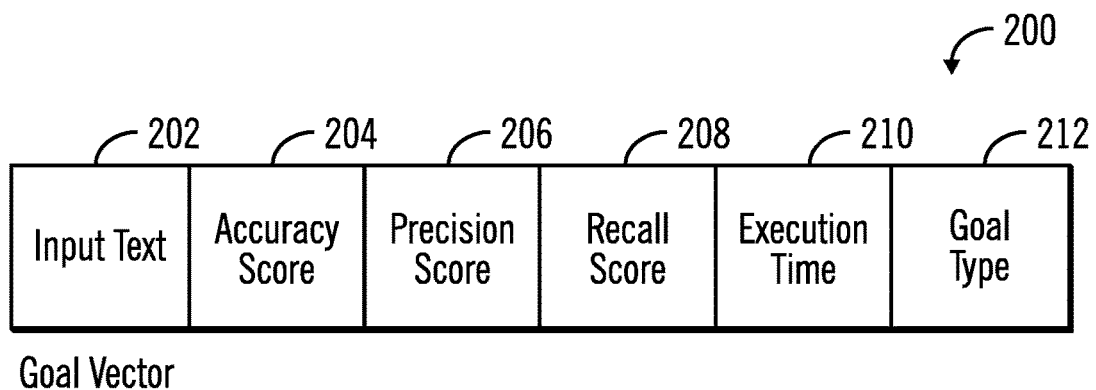
FIG. 2 illustrates an embodiment of a goal type providing information on goals classified from input text.

FIG. 2 illustrates an embodiment of an instance of goal vector 200 produced by the goal classifier 110 and includes an input text 202 identifier and different weighted goal scores to satisfy a criteria of the text, such as accuracy 204 (number of correct predictions made by the model over all kinds predictions made); precision 206 (percentage of positives that were true positives); recall 208 (ratio of correctly predicted results); an execution time 210 (an extent to which determining the outcome requires greater execution time); and a goal type 212, which may comprise the highest goal score of the goals 204-210. Other goal scores may also be determined from the text, such as F1 and others. Further, there may be goal scores specified that provide a combination of multiple of the goals 204, 206, 208, 210, such as the F1 goal score that provides a weighted average of precision and recall. The determined goal type 212 of the classified input text may comprise those one or more goals, such as precision, recall, accuracy, etc., having a highest score 204, 206, 208, 210.

Figure 3:
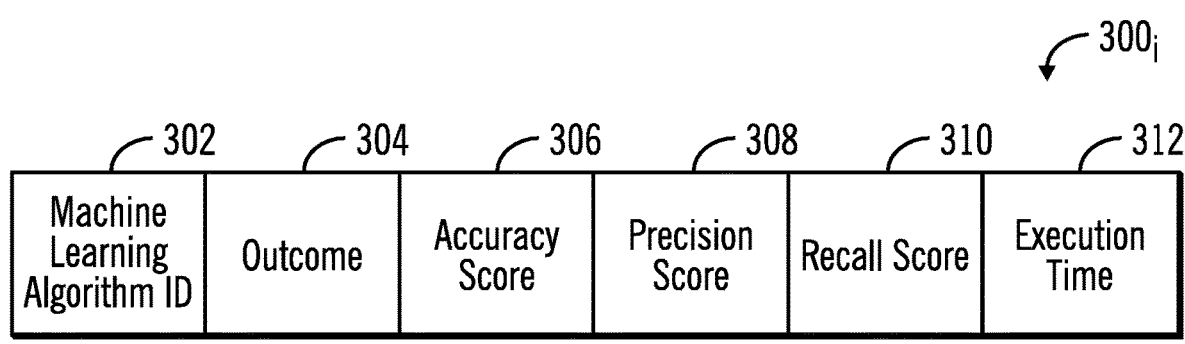
FIG. 3 illustrates an embodiment of machine learning output produced by a machine learning algorithm.

FIG. 3 illustrates an embodiment of an instance of machine learning output 300, from one of the machine learning algorithms 118 providing the outcome for the input text 112, such as an answer to a question, etc., and includes a machine learning algorithm identifier 302; an outcome 304 based in the input text 112; and different weighted performance measurements for the outcome 304, such as accuracy 306, precision 308, recall 310 and execution time 312.

Figure 4A:
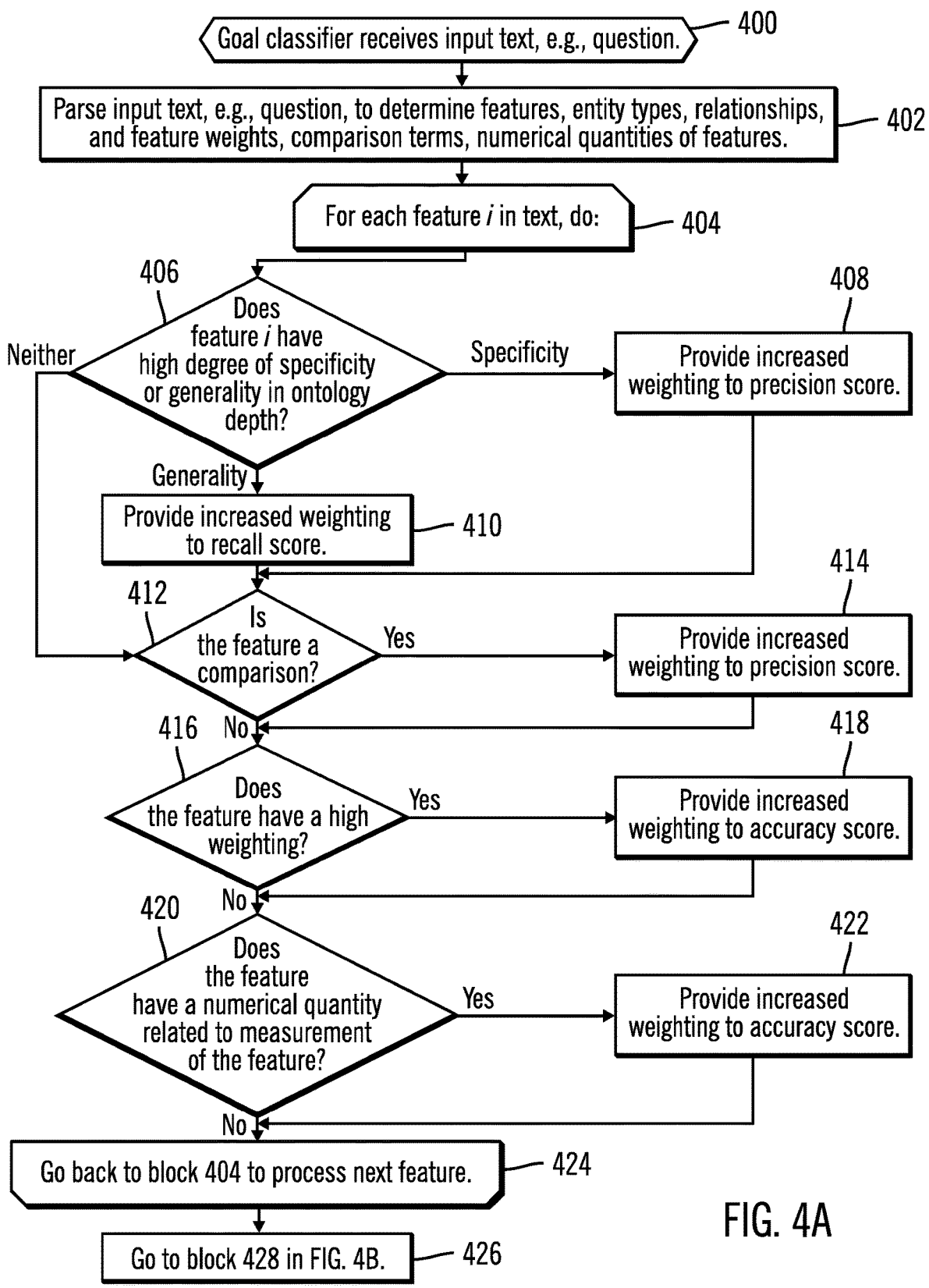
FIGS. 4*a* and 4*b* illustrates an embodiment of operations to determine a goal type from input text.
Figure 4B:
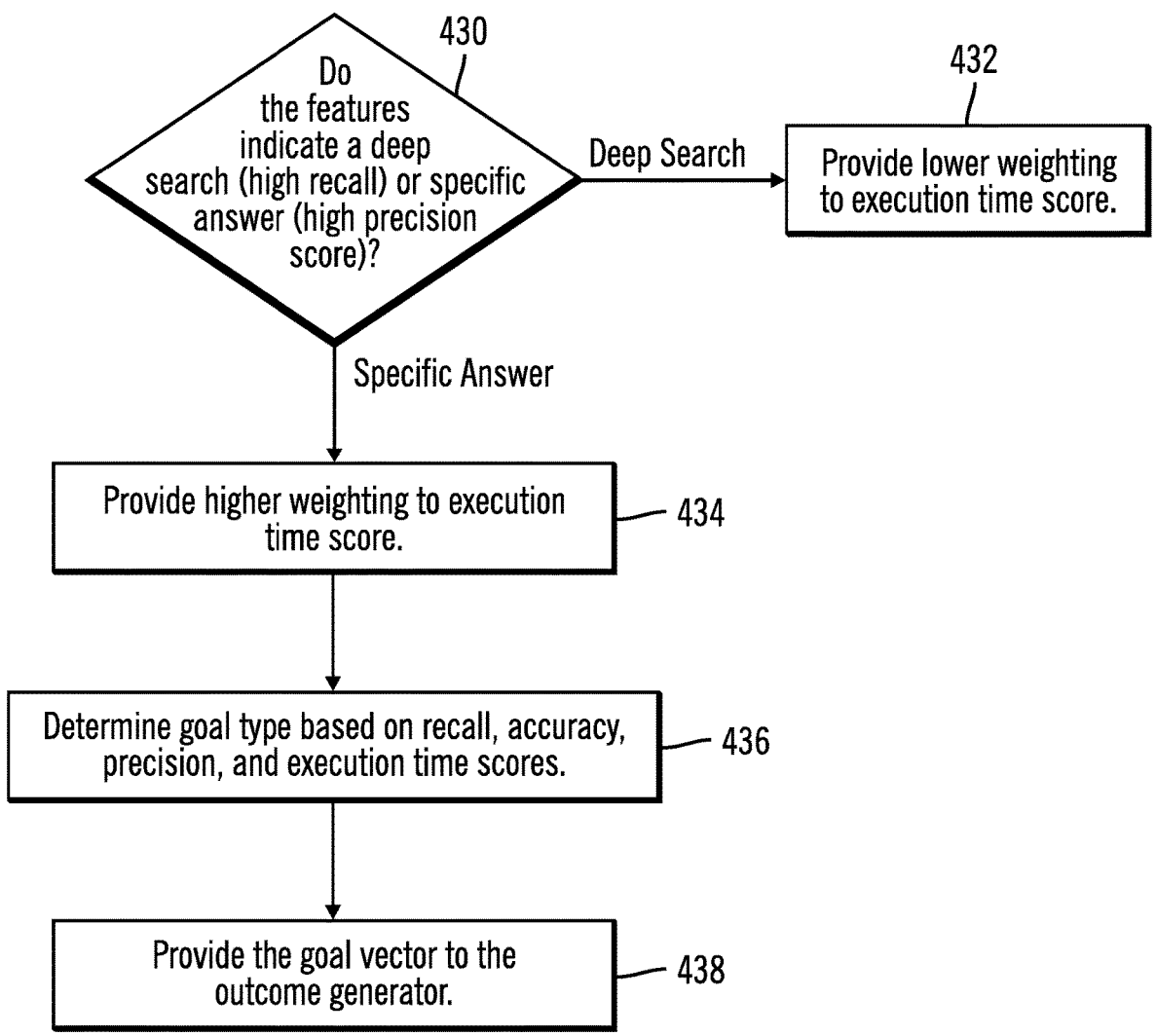

FIGS. 4*a* and 4*b* illustrate an embodiment of operations performed by the goal classifier 110 to generate a goal vector 200 and goal type 212 based on the input text 112. Upon receiving (at block 400) the input text 112, the goal classifier 110 parses (at block 402) input text, e.g., question, to determine features, entity types, relationships, feature weights, comparison terms, numerical quantities of features. A loop of operations is performed at block 404 through 424 for each feature i determined from the input text 112, where a feature comprises an individual measurable property or characteristic of the text 112, and may be extracted using filtration, fusion, mapping, and clustering. Features may provide information on the content words in the text 112, and weight of the feature. To determine the goal scores 204-210, the goal classifier 110 determines (at block 406) whether feature i has a high degree of specificity or generality in an ontology depth of the feature i. If (at block 406) the feature i has a high degree of specificity, e.g., a more specific instance of a class of terms or entity, then an increased weighting is provided (at block 408) to the precision score 206. If (at block 406) the feature i has a high degree of generality, e.g., a more general instance of a class of terms, then an increased weighting is provided (at block 408) to a recall score 208. For instance, a question in the input text 112 such as "Who and what kind of people entered the Post office?" has a high level of generality in the term "people", because it concerns a general class of humans, as opposed to specific class or person. Thus, because the goal is to find lots of "people", the goal would be "recall", to search for as many members as possible of the group or having the feature, e.g., persons. If the input text 122 has a question such as "get me the patients living in District 32", this has a high level of specificity in the term people satisfying a particular criteria. Thus, because the goal is to find a specific class or limited group of people, the goal is precision.

From block 408, 410 or if the feature i does not have a high degree of specificity or ontology, then a determination is made (at block 412) as to whether the feature i is a comparison. If (at block 412) the feature i is a comparison, then an increased weighting is provided (at block 414) to the precision score 206 because the comparison narrows the requested class to one matching the subject of the comparison. From block 414 or if (from the no branch of block 412) the feature i is not a comparison, then a determination is made (at block 416) as to whether feature i has a high weighting, meaning the feature is determined to be of particular determinative relevance in the input text 112. If (at block 416) the feature has a high weighting, then an increased weighting is provided (at block 418) to the accuracy score 204 to provide outcomes more specific to that highly weighted feature. If (at block 420) the feature i does not have a high weighting or from block 418, then a determination is made (at block 420) whether the feature i has a numerical quantity related to a measurement of the feature i. If so (at block 420), an increased weighting is provided (at block 422) to the accuracy score 204 weighting because a feature provided with an associated numerical quantity in the input text 112, e.g., X number of elements, so the outcome is specific to this information. In medical domains, a numerical quantity may be specified for an observed condition in a patient, such as the dimensions of a tumor or measurement, measured components in a blood test, etc. In such case, accuracy as to the medical outcome/diagnosis related to such observations is paramount to avoid misdiagnosis.

After processing the features in the input text 112, control proceeds (at block 426) to block 430 in FIG. 4b where the goal classifier 110 determines whether the features indicate a deep search, such as if the recall score 208 is high or a specific answer, associated with a high precision score 206. If (at block 430) the features indicate a deep search, then a lower weighting is provided (at block 432) to the execution time score 210 because determining the outcome does not necessarily require a greater amount of time to get an answer because the scope of answers is large. If (at block 430) the features indicate a specific answer, then a higher weighting is provided (at block 434) to the execution time score 210 because a specific answer is required, which may take more time to search to provide results. The goal classifier 110 may then determine (at block 436) a specific goal type 212 from the goal vector 200 scores by the score 204, 206, 208, and 210 having the highest value. The goal classifier 110 provides (at block 438) the determined goal vector 200 to the outcome generator 116 to use to process outcomes 300 from the machine learning algorithms 118.

FIGS. 4a and 4b provide improved computer technology to classify input text as having a goal type based on criteria of the input text that is related to performance measurements provided by the machine learning algorithm with outcomes, such as precision, recall, accuracy, etc. Described embodiments process the features of the input text 112 to determine weightings to goal type scores that relate to performance measurements provided by the machine learning algorithms 118. This goal type may then be used to determine which machine learning algorithm outcomes have performance measurements most correlated and relevant to the goal type of the input text, such as a question asked in the input text.

Figure 5:
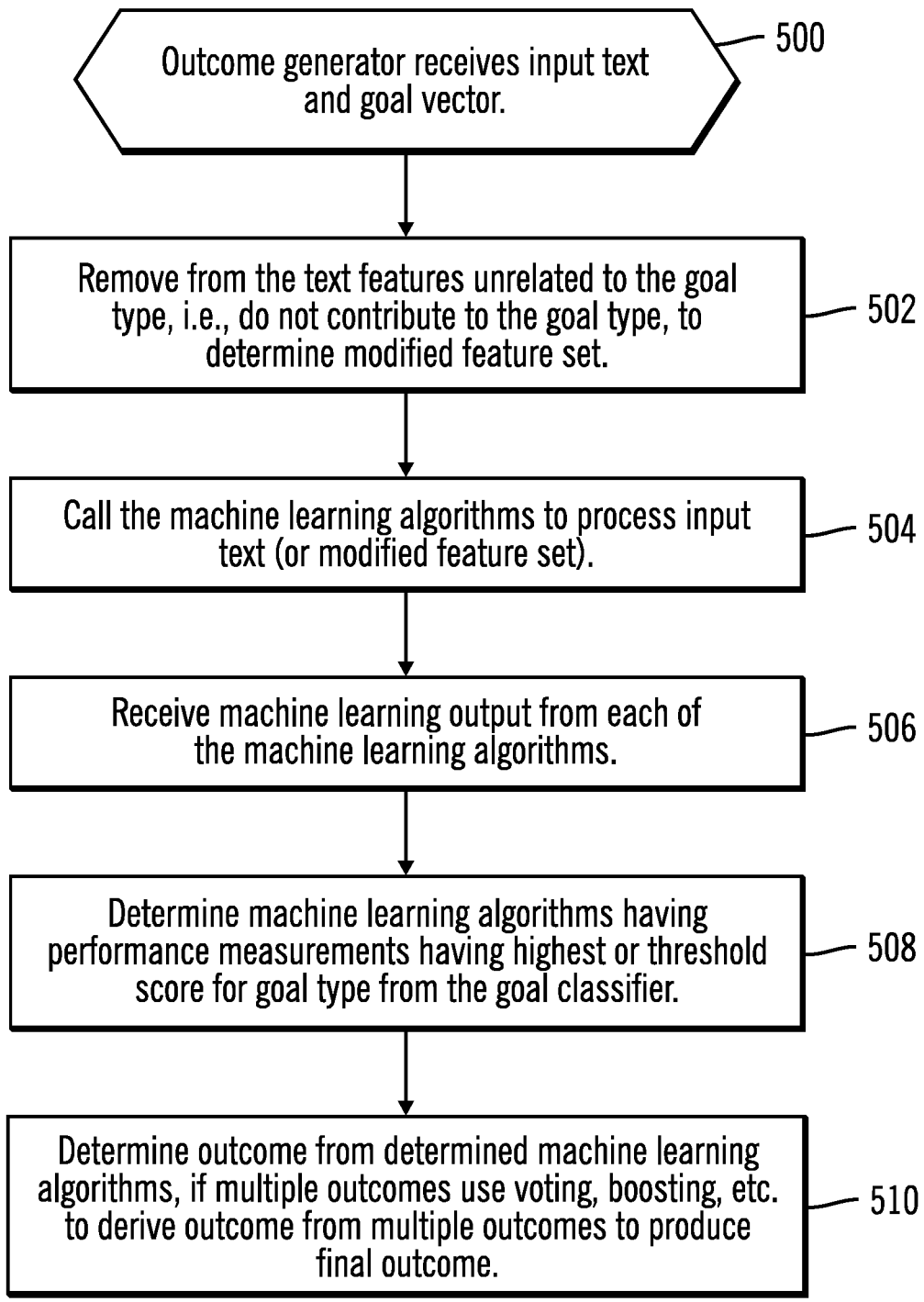
FIG. 5 illustrates an embodiment of operations to use the determined goal type to determine outcomes from machine learning algorithms.

FIG. 5 illustrates an embodiment of operations performed by the outcome generator 116 to generate outcomes 300 from the machine learning algorithms 118 and process to determine a final outcome 120. The outcome generator 116 receives (at block 500) input text 112 and a goal vector 200 providing the goal type 212 for the text, e.g., precision, accuracy, recall, execution time, etc. The outcome generator 116 (or the goal classifier 110) may remove (at block 502) text features unrelated/not contributing to the goal type 212, such as features having a chi-square (CHI) value indicating they do not contribute to the goal type classification, to produce a modified feature set 114. The outcome generator 116 calls (at block 504) the machine learning algorithms 118 to process the input text 112 (or the modified feature set 114) to determine outcomes 300.

The outcome generator 116 receives (at block 506) outcomes 300 from the machine learning algorithms 118, including an outcome 304, such as an answer to a question in the input text 112, and performance measurements 306, 308, 310, 312. The outcome generator 116 determines (at block 508) the machine learning algorithm 118 whose one or more performance measurements 306, 308, 310, 312 have the highest or threshold score for the goal type 212 from the goal classifier 110. For instance, if the goal type 212 is precision, i.e., precision 206 has the highest score, then the outcome generator 118 looks for the machine learning output $300_i$ having the highest or threshold precision score 308. The outcome generator 118 then determines (at block 510) the outcome 304 from the determined machine learning algorithm 118 having the highest or threshold satisfying performance measurement 306, 308, 310, 312 matching the goal type 212. There may be a plurality of machine learning algorithms 118 having performance scores most highly correlated to the goal type 212 if there are multiple outcomes $300_i$ having a performance measurement corresponding to the goal type 212 that have a matching highest value or satisfy the threshold for the goal type 212. In such case, the outcome generator 118 may use voting, boosting and other machine learning selection techniques to derive an outcome from a plurality of outcomes.

With the embodiment of FIG. 5, the determined goal type is used to select outcomes from machine learning algorithms or one machine learning algorithm having performance measurements highly correlated to the goal type determined from the input text, which goal type indicates the type of performance measurement that can produce the best outcome based on the outcome, e.g., answer, diagnosis, needed from the input text. For instance, for a question, different performance measurements may provide better outcomes/answers given the goals or criteria of the question.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
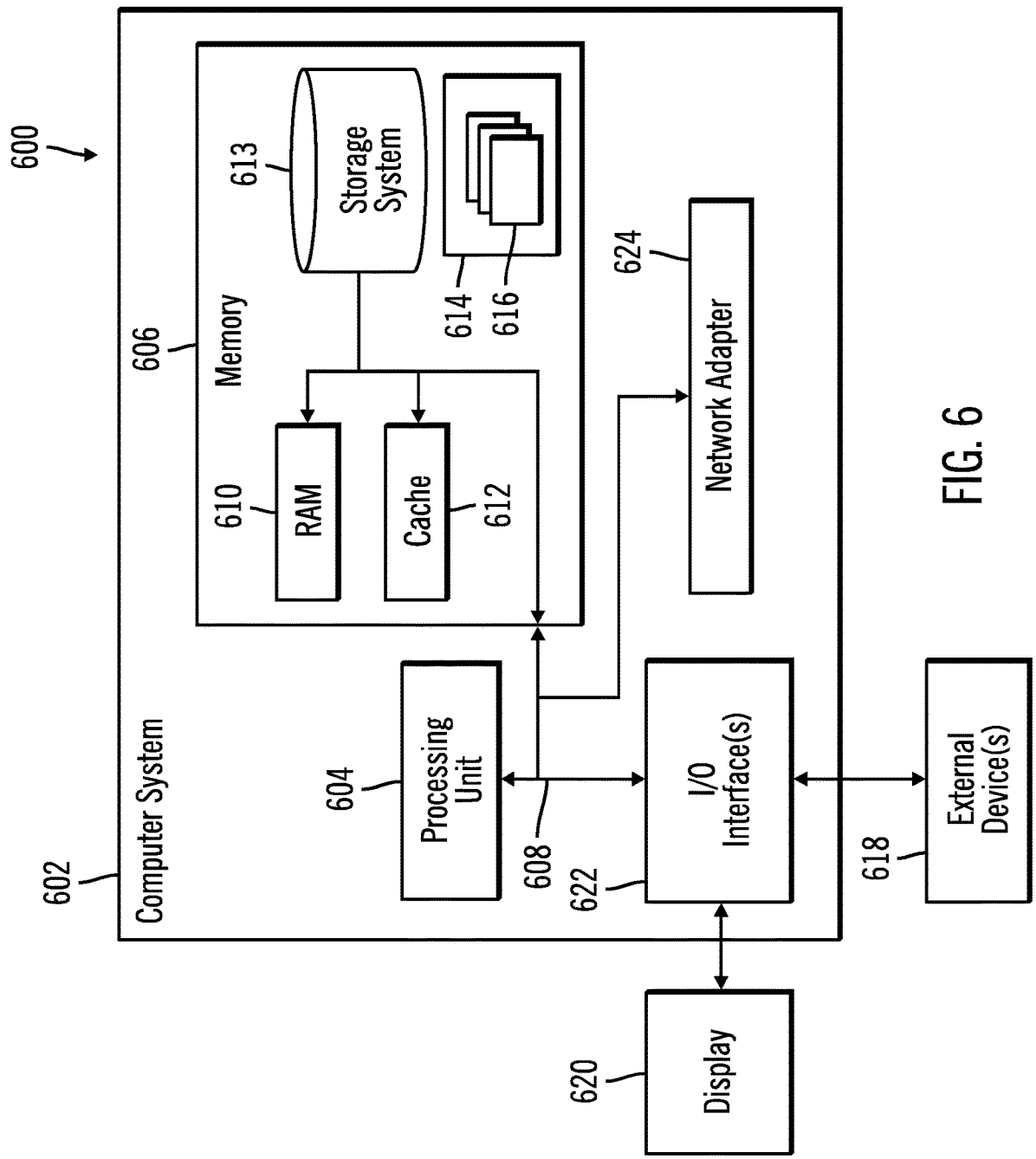
FIG. 6 illustrates a computing environment in which the components of FIG. 1 may be implemented

The computational components of FIG. 1, including the computer system 100, may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method implemented in a computer system for determining an outcome for text from machine learning algorithms, comprising:
    performing natural language processing of text to determine features in the text and their relationships;

classifying, with a classifier, the text based on the relationships and features of the text to determine a goal type of a plurality of goal types;
inputting the determined features and relationships from the text into a plurality of different machine learning algorithms to generate outcomes for the text;
determining performance measurements resulting from the machine learning algorithms;
determining at least one machine learning algorithm of the machine learning algorithms having performance measurements that are highly correlated to the determined goal type; and
determining an outcome from at least one of the outcomes of the determined at least one machine learning algorithm.

2. The method of claim 1, wherein the plurality of goal types include at least multiple of accuracy, precision, recall and execution time, and wherein the determined at least one machine learning algorithm comprises the at least one machine learning algorithm having performance measurements most highly correlated to the goal type.

3. The method of claim 2, wherein the determining the goal type comprises scoring each of the goal types by performing natural language processing of the text to determine features in the text, wherein the determined goal type comprises the goal type having a highest score of the goal types.

4. The method of claim 3, wherein the scoring the goal types comprises performing at least one determination that is a member of a set of determinations comprising:
determining whether the text includes a feature providing a high degree of specificity in an ontology depth, wherein the precision goal type is scored relatively higher to other of the goal types in response to determining that the feature provides a high degree of specificity in the ontology depth for the feature;
determining whether the text includes a feature having a high degree of generality in an ontology depth, wherein the recall goal type is scored relatively higher to other of the goal types in response to determining that the feature provides a high degree of generality in the ontology depth for the feature;
determining whether the text includes features comprising a comparison or a feature having a high weighting, wherein the precision goal type is scored relatively higher to other of the goal types in response to determining that the feature includes a comparison and the accuracy goal type is scored relatively higher to other of the goal types in response to determining that the feature has a high weighting;
determining whether the text has a feature comprising a numerical quantity that relates to a size of a related feature, including a medical condition, wherein the accuracy goal type is scored relatively higher than other of the goal types in response to determining that the feature comprises a numerical quantity relating to a size of a medical condition; and
determining whether the text has features indicating a deep search or a specific answer, wherein the execution time goal type is scored higher in response to determining that the features indicate a specific answer, and wherein the execution time goal type is scored lower in response to determining that the features indicate a deep search.

5. The method of claim 2, further comprising:
in response to determining the goal type, processing the determined features in the text to determine features unrelated to the determined goal type; and
removing the determined features in the text unrelated to the goal type, wherein the inputting the determined features comprises inputting the determined features not removed from the text.

6. The method of claim 1, wherein the text comprises a question and wherein the outcomes comprise answers to the question.

7. The method of claim 3, wherein the scoring the goal types comprises:
determining whether the text includes a feature providing a high degree of specificity in an ontology depth, wherein the precision goal type is scored relatively higher to other of the goal types in response to determining that the feature provides a high degree of specificity in the ontology depth for the feature.

8. The method of claim 3, wherein the scoring the goal types comprises:
determining whether the text includes a feature having a high degree of generality in an ontology depth, wherein the recall goal type is scored relatively higher to other of the goal types in response to determining that the feature provides a high degree of generality in the ontology depth for the feature.

9. The method of claim 3, wherein the scoring the goal types comprises:
determining whether the text includes features comprising a comparison or a feature having a high weighting, wherein the precision goal type is scored relatively higher to other of the goal types in response to determining that the feature includes a comparison and the accuracy goal type is scored relatively higher to other of the goal types in response to determining that the feature has a high weighting.

10. The method of claim 3, wherein the scoring the goal types comprises:
determining whether the text has a feature comprising a numerical quantity that relates to a size of a related feature, including a medical condition, wherein the accuracy goal type is scored relatively higher than other of the goal types in response to determining that the feature comprises a numerical quantity relating to a size of a medical condition.

11. The method of claim 3, wherein the scoring the goal types comprises:
determining whether the text has features indicating a deep search or a specific answer, wherein the execution time goal type is scored higher in response to determining that the features indicate a specific answer, and wherein the execution time goal type is scored lower in response to determining that the features indicate a deep search.

12. The method of claim 1, wherein the operations further comprise:
combining outcomes from a plurality of machine learning algorithms producing results satisfying the determined goal type, and selecting from the combined outcomes using at least one of scoring the results, majority voting or boosting.

* * * * *